Dec. 29, 1931.  L. E. HORNBECK  1,838,400
GRIP
Filed June 23, 1930
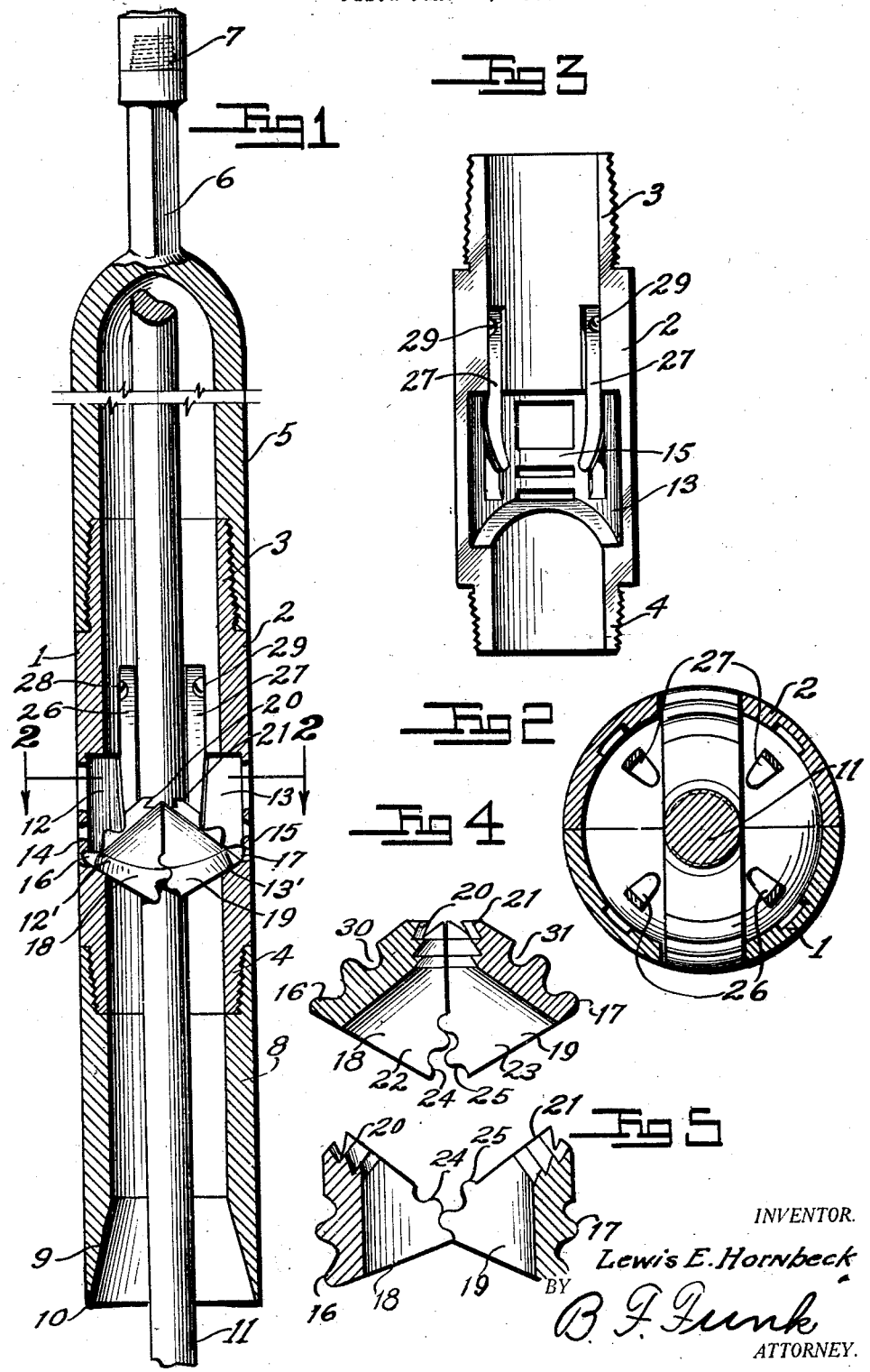
INVENTOR.
Lewis E. Hornbeck
BY
B. F. Funk
ATTORNEY.

Patented Dec. 29, 1931

1,838,400

UNITED STATES PATENT OFFICE

LEWIS E. HORNBECK, OF WELLINGTON, KANSAS, ASSIGNOR TO THE PRODUCTION EQUIPMENT COMPANY, OF WICHITA, KANSAS

GRIP

Application filed June 23, 1930. Serial No. 463,285.

This invention relates to "grips" and it is particularly designed for engaging or gripping objects to hold them. The invention is susceptible of multitudinous uses for gripping rods, chains, cables, pipe and the like so I do not wish to be limited entirely to any particular use. In order to illustrate the invention, I have shown it applied to a sucker rod fishing tool for oil wells, it being understood, of course, that the illustrated embodiment shows only one of many ways of applying the invention.

In carrying out the invention, I employ complementary jaws or slips which are movable to open positions so that the object to be gripped can pass between them and movable to object gripping positions to hold the object, there being certain novel features in the construction and application of the device which will be clearly apparent by reference to the following description in connection with the accompanying drawings in which:

Fig. 1 is a vertical, longitudinal, sectional view through a sucker rod fishing tool embodying my invention.

Fig. 2 is a cross-sectional view on the line 2—2 of Figure 1.

Fig. 3 is an elevational view of one of the cage members.

Fig. 4 is a cross-sectional view through the jaws or slips in gripping positions and Fig. 5 is a like view of the jaws or slips in open positions.

In the illustrated embodiment of my invention, I have shown a jaw or slip cage consisting of two semi-tubular members 1 and 2 which when combined, constitute a tubular cage within which the jaws or slips are held in operative positions. The tubular cage is shown as having conical threaded ends 3 and 4 to one of which is threaded a hollow cap 5 having a shank 6 with a collar 7 by means of which it can be attached to a string of rods so that the device can be let down into a well but the cap 5 can be so constructed that it may be secured to a cable, chain or the like. The other end of the cage 3 is connected to a threaded guide collar 8 having at its lower end a flared portion 9 terminating in a relatively sharp edge 10 to guide the rods 11 through the collar and up into the cap 5. It is to be understood that when the members 1 and 2 are brought together and the cap and collar are screwed on the ends of the members 1 and 2, the members 1 and 2 are held as a rigid part of the mechanical arrangement illustrated and that when the members 5 and 6 are unscrewed from the cage, the two parts 1 and 2 can be separated to introduce the slips or jaws to be hereinafter referred to.

Between the ends of the members 1 and 2 are half-round recesses 12 and 13 having rack-teeth 14 and 15 in the walls of the recesses to receive the external teeth 16 and 17 of the jaws or slips 18 and 19. The jaws or slips 18 and 19 are each in the form of one-half of a hollow cone and at the apex of the cone are impinging or gripping teeth 20 and 21, one set for each slip. The slips are also provided with side walls or webs 22 and 23 which in turn have intergeared teeth 24 and 25 so it will be seen that the slips have internal gear-teeth and external gear-teeth. The external gear-teeth mesh with the teeth in the recesses 12 and 13 and the internal gear-teeth of the complementary slips mesh one with the other. The slips are supported on the shoulders 12' and 13' of the cage members 1 and 2 at the bottoms of the recesses 12 and 13 and their gripping faces 20 and 21 are normally urged together by flat springs 26 in spaced relation in the member 1 and similar springs 27 in the member 2.

The flat springs are fastened to the interiors of each member 1 and 2 as indicated at 28 and 29 and their free ends engage in recesses 30 and 31 in the slips or jaws so that the gripping faces of the slips are normally urged together and are yieldingly held together by the springs. When the slips are used in any device for engaging an object, their lower faces first come into contact with the end of the object which rides up the conical inner faces to cause them to spread apart against the action of the springs. The slips will be held against longitudinal movement because they are geared to the cage which resists longitudinal movement in one direction while the shoulders 12' and 13' resist longitudinal movement in the opposite direction.

The fact that the slips or jaws are geared together by the segmental gearing or teeth 24 and 25 insures both jaws or slips rocking into open positions with equal amplitude of movement so as here shown, the slips or jaws can spread apart to provide a space substantially co-extensive with the inner diameter of the cage to permit the object to pass between them. A pull in an outward direction or a movement of the object indicated at 11 in an outward direction will cause the slips or jaws to tightly impinge or bind upon the object so that the object is gripped or held in an effective manner. The greater the pull of the object in an outward direction, the greater the gripping action of the slips because the gripping faces of the slips are eccentric to the pivot points or fulcrums of the slips. The fulcrums of the slips in the present instance are the shoulders 12' and 13'.

If the device is designed as a fishing tool for sucker rods and the like, it will be let down into the well so that the flared end 9 of the collar 8 will slip over the sucker rod and the end of the sucker rod will be guided through the space between the slips up into the cage and usually into the cap 5. An upward pull on the device will cause the slips to firmly grip the sucker rod so that it can be pulled from the well. When the device is at the top of the well, the cap will be unscrewed and the sucker rod or string of sucker rods, as the case may be, can be pulled through the slips in the direction of the end 3 of the cage. The cap can then be screwed on to the end 3 and the device will again be ready for use.

From the nature of the invention, it will be apparent that the cage and slip arrangement is susceptible of many uses for gripping different kinds of objects so I do not wish to be limited to any particular use.

What I claim and desire to secure by Letters-Patent is:—

1. A gripping device comprising a cage, and gripping members geared to the cage and geared together.

2. A gripping device comprising a cage insertable in an oil well, gripping members geared to the cage and geared together, the upper portions of the gripping members having object engaging edges, and said members being of semi-conical form.

3. A gripping device comprising a cage having a central opening, gripping devices of semi-conical form mounted to rock in the cage, having complementary gear-teeth whereby the gripping devices are geared together, and geared connections between the cage and the gripping devices.

4. A gripping device comprising a cage, gripping devices geared to the cage and geared together, and yielding members in the cage bearing against the gripping members to normally urge them together.

5. A gripping device comprising an elongated cage, a pair of gripping devices jointly forming a cone and having geared connections, and geared connections between the gripping devices and the cage.

6. A gripping device comprising a cage having a central opening, gripping devices mounted to rock in the cage having complementary gear-teeth whereby the gripping devices are geared together, and gear connections between the cage and the gripping devices.

In testimony whereof I affix my signature.

LEWIS E. HORNBECK.